US006570715B2

(12) United States Patent
Chen et al.

(10) Patent No.: US 6,570,715 B2
(45) Date of Patent: *May 27, 2003

(54) ULTRA-WIDE FIELD OF VIEW CONCENTRIC SCANNING SENSOR SYSTEM WITH A PIECE-WISE FOCAL PLANE ARRAY

(75) Inventors: Chungte W. Chen, Irvine, CA (US); John S. Anderson, Santa Monica, CA (US); George F. Baker, Hesperia, CA (US); C Thomas Hastings, Jr., Manhattan Beach, CA (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,763

(22) Filed: Mar. 21, 2001

(65) Prior Publication Data

US 2002/0135885 A1 Sep. 26, 2002

(51) Int. Cl.⁷ .............................. G02B 3/00; G02B 13/06
(52) U.S. Cl. ..................... 359/664; 359/725; 359/727
(58) Field of Search ................................ 359/725, 727, 359/664

(56) References Cited

U.S. PATENT DOCUMENTS

| 3,899,145 A | | 8/1975 | Stephenson |
| 4,184,749 A | * | 1/1980 | Grossman .................... 359/722 |
| 5,012,081 A | * | 4/1991 | Jungwirth et al. ....... 250/203.6 |
| 5,274,235 A | | 12/1993 | Taylor |
| 5,721,585 A | | 2/1998 | Buford et al. |
| 6,233,100 B1 | * | 5/2001 | Chen et al. .................. 359/727 |
| 6,320,703 B1 | | 11/2001 | Chen et al. |

FOREIGN PATENT DOCUMENTS

JP 63 266589 11/1988

OTHER PUBLICATIONS

Patent Abstract of Japan vol. 013, No. 085 (P–834) Feb. 27, 1989.

* cited by examiner

Primary Examiner—Scott J. Sugarman
(74) Attorney, Agent, or Firm—Colin M. Raufer; Leonard A. Alkov; Glenn H. Lenzen, Jr.

(57) ABSTRACT

A compact, high numerical aperture, high resolution, ultra-wide field of view concentric scanning optical sensor. In a most general embodiment, the inventive optical arrangement (10) includes an at least semi-spherical lens (14) having a base; a reflective surface (16) centered at a center of said base and parallel thereto; and an array (20) of detectors dispose to receive electromagnetic energy received through said lens and reflected by said surface. In the illustrative embodiment, the semi-spherical lens is a ball lens (14). The reflective surface is aspheric and designed to effect aberration correction. A mechanism (19) is included for rotating the ball lens (14) causing the system to scan. A dome lens (18) is disposed over the ball lens and concentric therewith. Electromagnetic energy is received through the dome and ball lenses and reflected by the mirror to the detector array. A field lens assembly (21) is disposed between the detectors and the mirror. The field lens assembly allows for the use of flat piece-wise sensor chip assemblies (SCAs). The use of flat SCAs allows the system to have the compact advantages of a concentric system without the need of expensive curved focal surface array.

35 Claims, 3 Drawing Sheets

ULTRA-WIDE FIELD OF VIEW CONCENTRIC SCANNING SENSOR SYSTEM WITH A PIECE-WISE FOCAL PLANE ARRAY

BACKGROUND OF THE INVENTION

1. Field of the Invention:

The present invention relates to electro-optic sensor systems. More particularly, the present invention relates to ultra-wide field of view scanning electro-optic sensor systems.

2. Description of the Related Art

A typical acquisition sensor requires an optical system capable of very wide field of view. Most conventional wide field of view scanning systems are either of the fisheye lens form or concentric Bouwers system. Unfortunately, most wide field of view systems such as a fisheye lens or Bouwers system are generally large.

For a fisheye lens, the overall length from the vertex of the lens to the focal plane is typically at least 6 times the effective focal length (EFL). Consequently, these lenses are large and heavy. In many cases, aspheric lenses are needed for both aberration and distortion correction. Additionally, the implementation of a scanner near the pupil plane (aperture stop), necessitated by this design, is a challenging task.

A Bouwers system is a catadioptric monocentric optical system consisted of a refractive corrector and a spherical mirror. Although the Bouwers system is a concentric design form, the overall length is still 2 times the EFL. Additionally, the generic central obscuration characteristics associated with a Bouwers system often limits the effective F/# and the field of view coverage. Although a scanner close to the aperture stop can be decentered to alleviate the obscuration problem, the F/# and field of view are further compromised.

Accordingly, a need has existed in the art for a compact, lightweight wide field of view optical system. The need is addressed somewhat by U.S. patent application Ser. No. 09/413,985, entitled Ultra-Wide Field of View Concentric Sensor System, filed May 19, 1999 by C. W. Chen et al. and U.S. patent application Ser. No. 09/413,688, entitled Ultra-Wide Field of View Concentric Scanning Sensor System, filed Oct. 7, 1999 by C. W. Chen et al., the teachings of which are incorporated herein by reference. In the referenced Applications, Chen et al. disclose and claim a compact, high numerical aperture, high resolution, ultra-wide filed-of-view concentric optical sensor. However, the required curved focal surface array (FSA) concentric to the center of the optical system adds cost and technical complexity in fabrication.

Hence, a need remains in the art for a compact, lightweight ultra-wide field of view optical system suitable for use in acquisition applications that is easy to manufacture.

SUMMARY OF THE INVENTION

The need in the art is addressed by the optical system of the present invention. In a most general embodiment, the inventive optical arrangement includes an at least semispherical lens having a base; a reflective surface centered at a center of said base and parallel thereto; and an array of detectors dispose to receive electromagnetic energy received through said lens and reflected by said surface.

In the illustrative embodiment, the semi-spherical lens is a ball lens. A dome lens is disposed over the ball lens and concentric therewith. Electromagnetic energy is received through the dome and ball lenses and reflected by the mirror to the detector array. The reflective surface of the mirror is aspheric and designed to effect aberration correction. A mechanism is included for rotating the ball lens thereby causing the system to scan. A field lens assembly (FSA) is disposed between the detectors and the mirrors. The field lens assembly allows for the use of flat piece-wise sensor chip assemblies (SCAs). An array of SCAs is employed to provide a focal surface array. In a first alternative embodiment, the focal surface array is a 120° arc around the ball lens. In a second alternative embodiment, the mirror is reflective on both sides thereof to double the scanning rate. In the preferred implementation, the ball lens is cut in half or provided as two separate halves. Each side of the mirror is etched or cut into a half of the ball lens and the two halves are joined to provide a complete sphere. In yet another alternative embodiment, an external multi-faceted reflective surface is scanned to direct energy into the ball lens thereby eliminating the requirement to rotate the ball lens.

In short, the invention is a compact, high numerical aperture, high resolution, ultra-wide field of view (FOV) concentric scanning optical sensor. The field of view coverage can be as large as 160 degrees. Yet, the sensor volume is approximately 20 times smaller than that of the corresponding fisheye lens. The use of flat SCAs allows the system to have the compact advantages of a concentric system without the need of expensive curved FSAs.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A sensor constructed according to the present invention consists of a concentric refractive optical system with dome and ball lenses, a field lens array and a piece-wise Focal Surface Array (FSA). The piece-wise FSA consists of several small flat sensor chip assemblies (SCA), which are arranged along the arc of the focal surface concentric to the optical system. To reduce the size of the FSA, a linear detector array in conjunction with a scanner is used to scan the two dimensional FOV. The scanning process is accomplished by rotating the entire half ball lens. Each small SCA has a field lens to flatten the field. With this field lens array arrangement, the focal surface is a piece-wise multi-facet surface that is relatively easy to manufacture.

Figure 1:
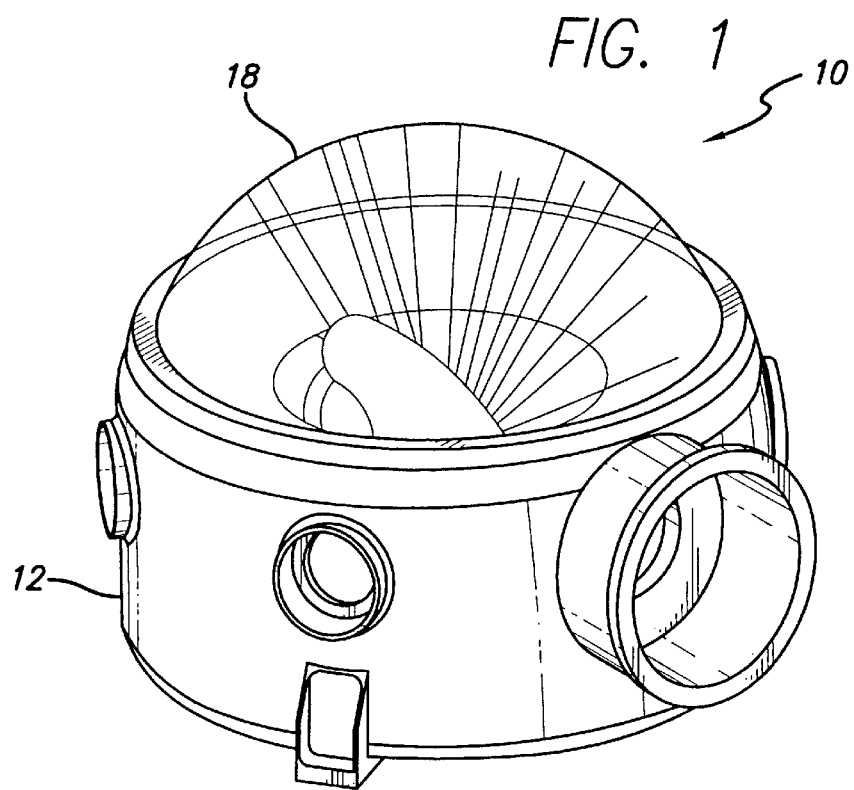
FIG. 1 is a perspective view of an ultra-wide field of view concentric scanning sensor system implemented in accordance with the teachings of the present invention.

FIG. 1 is a perspective view of an ultra-wide field of view concentric scanning to sensor system implemented in accordance with the teachings of the present invention.

Figure 2:
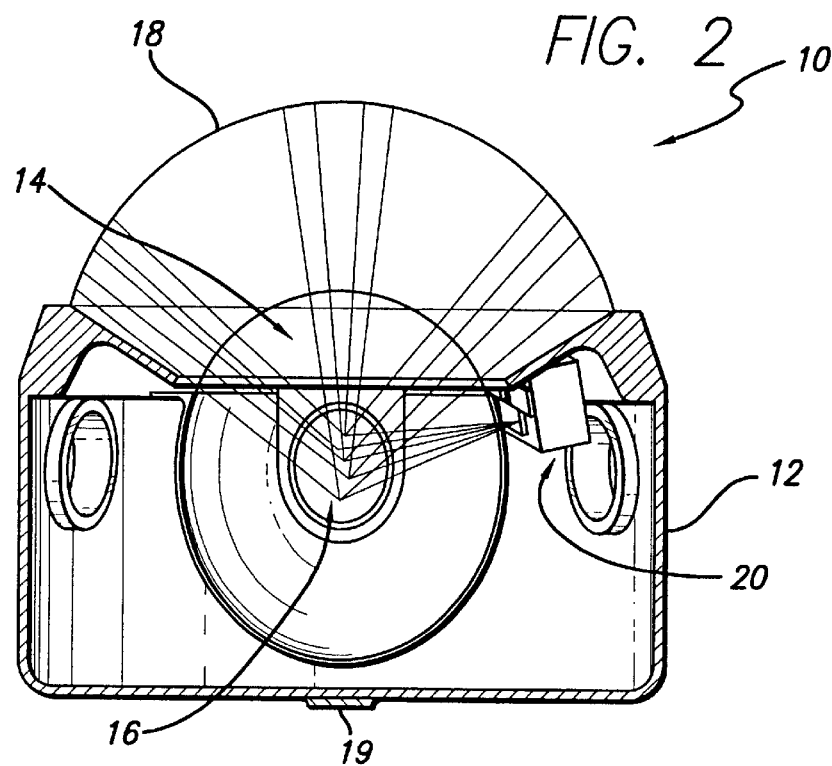
FIG. 2 is a side view of the ultra-wide field of view concentric scanning sensor system implemented in accordance with the teachings of the present invention.

FIG. 2 is a side view of the ultra-wide field of view concentric scanning sensor system implemented in accordance with the teachings of the present invention. As illustrated in FIGS. 1 and 2, the inventive sensor system 10 includes a gimbal housing 12. The gimbals (not shown) allow the sensor 10 to be pointed accurately notwithstanding movement of the frame on which it is mounted as is common in the art. The housing 12 may be constructed of Berylcast or other suitable material. The housing 12 is shaped to receive a ball lens 14. The ball lens 14 may be a semi-spherical half ball lens or a full ball lens. The ball lens 14 may be constructed of optical grade glass, zinc selenide, zinc sulfide or other material suitable for a given application. A weak aspheric mirror 16 is centered at the center of the ball lens 14. In the illustrative embodiment, the mirror 16 is 0.6 micron from flat. The mirror 16 provides aberration correction. A dome lens 18 is mounted on the housing 12. The dome lens 18 is concentric with the ball lens 14. In the illustrative embodiment, the dome lens 18 is a hollow semi-sphere constructed of optical grade germanium and has an optical power $\frac{1}{8}^{th}$ to $\frac{1}{10}^{th}$ the power of the ball lens and negative (divergent). The ball lens 14 provides the main optical power of the system. In the illustrative embodiment, the ball lens 14 has an optical power 10% to 20% higher than the desired system power to compensate for the negative power of the dome lens 18. The mirror 16 reflects electromagnetic energy received by the dome lens 18 and the ball lens 14 to a focal surface array (FSA) 20. The field lens array 21 is used to correct the field curvature of the concentric refractive ball lens and dome structures. Consequently. the present invention allows the use of a piece-wise FSA 20 consisting of a flat sensor chip assembly (SCA) array in place the typical curved FSA in prior ultra-wide field of view sensor assemblies. The focal surface array 20 is shown more clearly in FIGS. 3 and 4.

Figure 3:
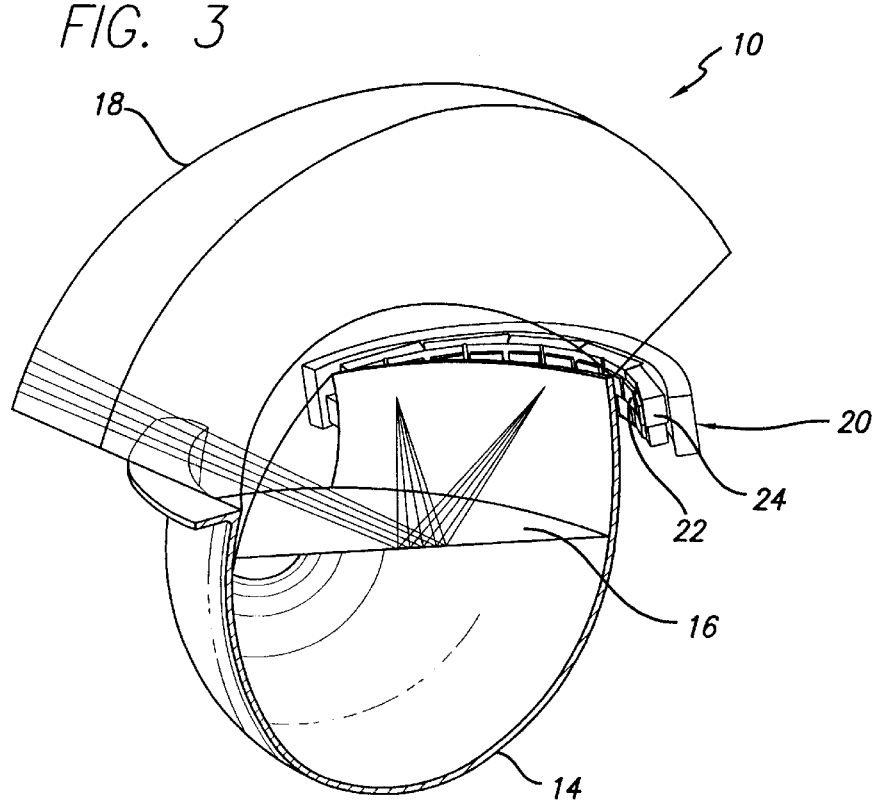
FIG. 3 is a sectional side view of the ultra-wide field of view concentric scanning sensor system implemented in accordance with the teachings of the present invention.

FIG. 3 is a sectional side view of the ultra-wide field of view concentric scanning sensor system implemented in accordance with the teachings of the present invention. As shown in FIG. 3, the FSA 20 is mounted within the housing 12 (not shown in FIG. 3) to receive electro-magnetic energy received through the dome lens to 18 and the ball lens 14 and reflected by the mirror 16.

Figure 4:
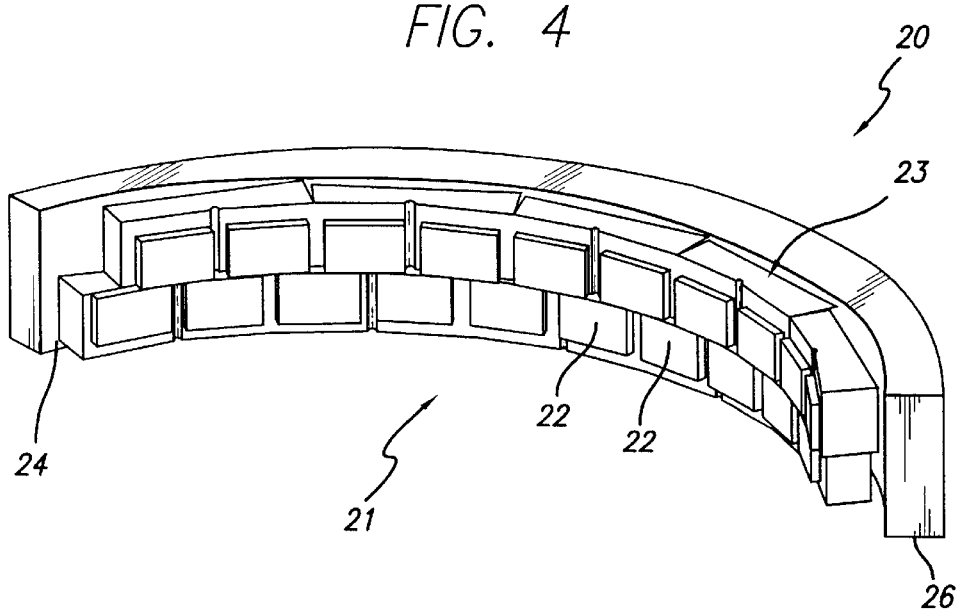
FIG. 4 is an isolated perspective view of the focal surface array of the ultra-wide field of view concentric scanning sensor system implemented in accordance with the teachings of the present invention.

FIG. 4 is an isolated perspective view of the focal surface array of the ultra-wide field of view concentric scanning sensor system implemented in accordance with the teachings of the present invention. As illustrated in FIG. 4, the FSA 20 is implemented with an assembly or array 21 of field lenses 22 which are mounted in front of an array 23 of detector elements 24 beneath the field lens 22. Each field lens 22 is constructed of optical grade materials such as Calcium Fluoride and is mounted at the input aperture of a corresponding detector element 24.

In accordance with the present teachings, the arrangement of field lens array 21 of the present invention in front of the array 23 of SCAs 4 allows for the use of no piece-wise flat SCAs and obviates the curved FSA typically required in prior art ultra-wide field of view sensors. This is particularly advantageous inasmuch as the flat SCA array is much easier to implement that a curved FSA. The SCA array 23 is inscribed by a sphere concentric to the center of the optical system.

The FSA 20 is mounted on a curved support structure 26 which may be metal, beryllium or other suitable material. In a first alternative embodiment, the focal surface array is a 120° arc around the ball lens. This may be implemented by simply adding a second FSA to the other side of dome lens to double the scanning efficiency.

Returning briefly to FIG. 2, scanning of the system is effected by a scanning wheel 19 which is mounted on an axis not shown. The wheel 19 is mounted in contact with the ball lens to effect rotation thereof with respect to a rotation axis therethrough. The rotation axis is chosen to optimize the reflection of energy to the FSA 20. The operation of the sensor system 10 is best illustrated with reference to FIGS. 5a and 5b below.

Figure 5A:
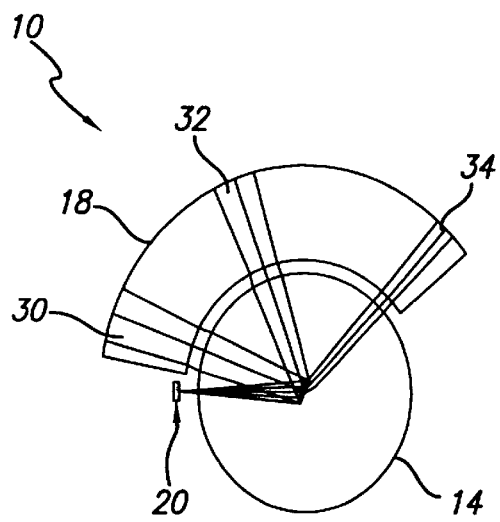
FIG. 5a is a side view of an optical schematic of the ultra-wide field of view concentric scanning sensor system implemented in accordance with the teachings of the present invention.

FIG. 5a is a side view of an optical schematic of the ultra-wide field of view concentric scanning sensor system implemented in accordance with the teachings of the present invention.

Figure 5B:
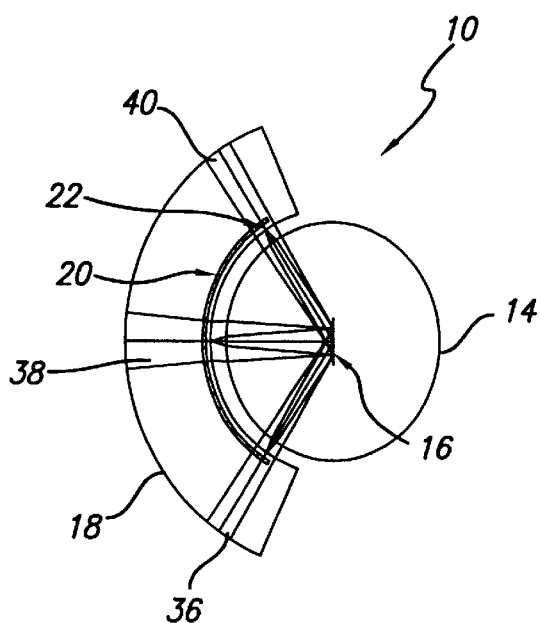
FIG. 5b is a top view of the optical schematic of the ultra-wide field of view concentric scanning sensor system implemented in accordance with the teachings of the present invention.

FIG. 5b is a top view of the optical schematic of the ultra-wide field of view concentric scanning sensor system implemented in accordance with the teachings of the present invention. In operation and with reference to FIGS. 5a and 5b. incoming electromagnetic radiation (visible, infrared, etc.) 30, 32 and 34 in FIG. 5a and 36, 38 and 40 in FIG. 5b first passes through the concentric dome lens 18 and half of the ball lens 14. is reflected back by the rear flat reflective surface 16 of the ball lens 14, passes through the same half of the ball lens 14 to one of the field lenses 22, and is finally focused onto the SCA array 23 on the FSA 20.

The aperture stop is located at the mirror surface of the ball lens 14. The optical surfaces are concentric with the curvature of the ball lens 14. Since the optical elements are concentric with respect to the aperture stop (except the field lens array 21), the image quality is practically identical for every field point. As mentioned above, to further improve the image quality, the mirror 16 can be a generalized aspheric or bilateral symmetric optical surface. This symmetry principle makes concentric design very simple both in design and fabrication.

In a second alternative embodiment, to further increase the scanning efficiency, a full ball with a dual-sided mirror can be implemented to double the scanning rate thereof. This is effected by use of a mirror 16 which is reflective on both sides thereof. In an illustrative fabrication process, the ball lens 14 is cut in half or provided initially as two separate halves. Each side of the mirror 16 is etched or cut into a semi-spherical half of the ball lens and the two halves are joined to provide the full ball lens as a complete sphere.

In yet another alternative embodiment, an external multi-faceted reflective surface is scanned to direct energy into the ball lens thereby eliminating the requirement to rotate the ball lens 14. This is illustrated with respect to FIG. 6 below.

Figure 6:
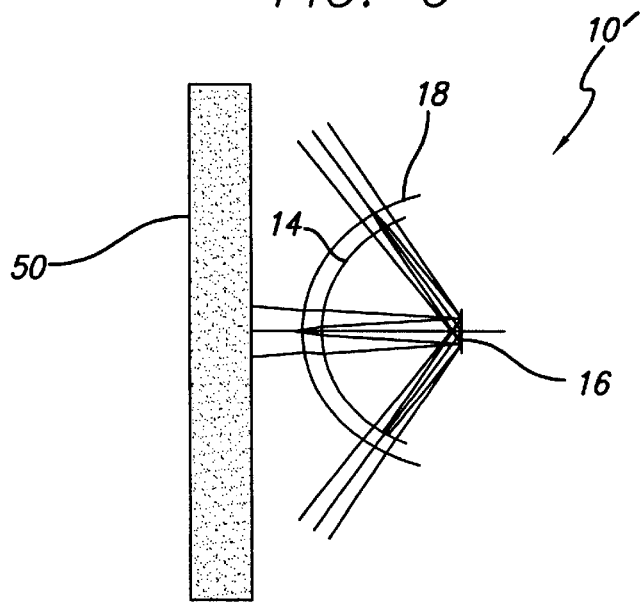
FIG. 6 is a schematic diagram showing an alternative embodiment of the ultra-wide field of view concentric scanning sensor system implemented in accordance with the teachings of the present invention.

FIG. 6 is a schematic diagram showing an alternative embodiment of the ultra-wide field of view concentric scanning sensor system implemented in accordance with the teachings of the present invention. FIG. 6 illustrates that, to further improve the scanning efficiency, instead of rotating the ball lens 14 to scan a scene, an object space scanning mechanism such as a conventional multi-faceted scanning mirror 50 may be used. In this embodiment, the scanning mirror 50 is mounted external to the sensor 10 and adapted to reflect energy to the mirror 16 thereof. The scanning wheel 19 may be eliminated or used to retain the mirror in an optimal fixed position relative to the FSA 20 (not shown in FIG. 6).

Those skilled in the art will appreciate that the invention allows for implementation of a compact, high numerical aperture, high resolution, ultra-wide field of view (FOV) concentric scanning optical sensor. The field of view coverage can be as large as 160 degrees. Yet, the sensor volume may be approximately 20 times smaller than that of the corresponding fisheye lens. The use of flat SCAs allows the system to have the compact advantages of a concentric system without the need of expensive curved FSAs.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An optical system comprising:
   an at least semi-spherical lens having a base;
   a reflective surface centered at a center of said base and parallel thereto; and
   an array of detectors disposed to receive electromagnetic energy received through said lens and reflected by said surface.

2. The invention of claim 1 further including a dome lens disposed over said lens.

3. The invention of claim 2 wherein said dome lens is concentric with said at least semi-spherical lens.

4. The invention of claim 1 wherein said lens is transparent.

5. The invention of claim 4 wherein said lens is a ball lens.

6. The invention of claim 5 wherein said reflective surface is reflective on both sides thereof.

7. The invention of claim 5 further including means for scanning said ball lens.

8. The invention of claim 1 wherein said reflective surface is aspheric.

9. The invention of claim 8 wherein said reflective surface is adapted for aberration correction.

10. The invention of claim 1 further including a field lens assembly disposed between said detectors and said mirror.

11. The invention of claim 1 wherein said array of detectors is a focal surface array.

12. The invention of claim 11 wherein said focal surface array is a piece-wise focal surface array.

13. The invention of claim 12 wherein said piece-wise focal surface array includes at least one flat sensor.

14. The invention of claim 13 wherein said sensor is a sensor chip array.

15. The invention of claim 1 further including a reflective surface mounted external relative to said lens.

16. The invention of claim 15 wherein said external reflective surface is multi-faceted.

17. The invention of claim 16 further including means for scanning said external reflective surface.

18. An optical system comprising:
    a concentric dome lens;
    a half ball concentric lens;
    a reflective surface at the center of the ball;
    at least one field lens assembly; and
    a piece-wise focal surface array.

19. The invention of claim 18 wherein the piece-wise focal surface array has at least one flat sensor chip array.

20. The invention of claim 18 wherein the field lens assembly consists of at least one field lens.

21. The invention of claim 18 further including means for rotating the half ball lens.

22. The invention of claim 18 wherein the reflective surface is flat.

23. The invention of claim 22 wherein the reflective surface is an aspheric surface.

24. The invention of claim 22 wherein the reflective surface is bilaterally symmetric.

25. The invention of claim 18 wherein at least one of the dome lenses has an index of refraction higher than that of the ball lens.

26. The invention of claim 18 wherein at least one of the dome lenses has index of refraction more dispersive than that of the ball lens.

27. The invention of claim 18 wherein the piece-wise focal surface array is mounted on a ring structure.

28. The invention of claim 27 including means for varying the position and radius of the structure.

29. The invention of claim 18 further including means for scanning said ball lens.

30. The invention of claim 29 wherein said means for scanning includes means for varying the angular velocity of the ball during the scan to maximize scan efficiency.

31. An optical system comprising:
    at least one concentric dome lens;
    a spherical ball concentric lens;
    a double-side reflective surface provided at the center of the ball,
    at least one field lens assembly; and
    a piece-wise focal plane array.

32. The invention of claim 31 wherein the reflective surface is a flat.

33. The invention of claim 31 wherein the reflective surface is an aspheric.

34. The invention of claim 31 wherein the reflective surface is a bilaterally symmetric.

35. An optical system comprising:
    a concentric dome lens with a higher index variation material with respect to the temperature change;
    a half ball concentric lens with lower index variation material with respect to the temperature change; and
    a reflective surface centered at the center of the ball;
    at least a field lens assembly; and
    a piece-wise focal plane array.

* * * * *